United States Patent [19]
Pope

[11] Patent Number: 5,870,170
[45] Date of Patent: Feb. 9, 1999

[54] METHOD AND APPARATUS FOR ANIMATING A SEQUENCE OF OBJECTS

[76] Inventor: Ovid Pope, 1912 Walcott Way, Los Angeles, Calif. 90039

[21] Appl. No.: 833,316

[22] Filed: Apr. 4, 1997

[51] Int. Cl.[6] .................................................. G03B 25/00
[52] U.S. Cl. .............................. 352/101; 352/102; 352/87
[58] Field of Search ................................. 352/43, 86, 101, 352/102, 87; 40/411

[56] References Cited

U.S. PATENT DOCUMENTS

| | | | |
|---|---|---|---|
| 64,117 | 4/1867 | Lincoln | 352/101 |
| 1,014,365 | 1/1912 | Bourgin | 352/101 |
| 1,787,333 | 12/1930 | Abel | 352/102 |

*Primary Examiner*—Russell Adams
*Attorney, Agent, or Firm*—Sughrue, Mion, Zinn, Macpeak & Seas, PLLC

[57] ABSTRACT

A method of combining a series of inanimate three dimensional objects(2), a rotational surface (4), and a strobe light(8) in order to achieve the illusion of animation. In the present invention a plurality of objects(2) are demountably fixed, in cyclical order, to a rotational surface(4), each within its own staging area(6). Each successive object(2) is subtly different in shape, size, color or pose to that of the prior object(2) in the sequence. A strobe light(8) is disposed facing the objects(2) as they revolve on the rotational surface(4). The strobe light(8) pulses with consistent periodicity so as to act like a visual shutter. This causes a pulsing illumination of the objects(2) as they cycle on the rotational surface(4). To achieve the optimum effect of animation, the rate of pulse should be one flash of light per object(2) as it traverses through each stationary staging area(6). Due to the persistence of vision, the illusory appearance of sustained movement is achieved.

11 Claims, 4 Drawing Sheets

METHOD AND APPARATUS FOR ANIMATING A SEQUENCE OF OBJECTS

BACKGROUND-FIELD OF INVENTION

This invention relates to the simulation of motion by means of a strobe light and its effect on a sequence of inanimate objects attached to a rotational surface.

BACKGROUND-DESCRIPTION OF PRIOR ART

Previous animation devices such as the hand spun phenakistoscope designed in 1832 by Joseph Plateau, and the zoetrope developed by William Horner around 1834, require a rotating disk or cylindrical drum with vertical view slits to create a shutter effect on the series of images applied to the disk or inner cylindrical drum as it spins in order to achieve the illusion of animation. The disk or cylindrical drum restricts the spectator to view the effect from a specific area.

In another variation of this device, invented by Emil Reynuad in the 1890's, the need for view slits is eliminated by employing a set of mirrors which are positioned in the center of the disk or cylindrical wall to reflect the graphic images toward the spectator. However the implementation of these mirrors also restricts the sight lines from which the effect can be observed.

The series of images used in these earlier animation devices are of a graphic two dimensional nature and can only be viewed by looking through and to the far side of the inner cylindrical drum. This restriction of sight line limits the duration of view time per graphic image. In addition, the images or characters are also restricted to a two dimensional cylindrical plane, thus preventing a three dimensional range of play or movement during animation.

The need to manually spin devices of this type, results in an irregular and ultimately decaying speed. Some devices of this nature have been designed to incorporate a phonographic record player to provide a consistent rotational speed, however due to the advancement of current technology, record players are no longer commonly available in the average household.

Accordingly it is the object of the present invention to provide a method and apparatus for providing real time animation of inanimate objects to be observed without the obstruction of a cylindrical drum.

It is a further object of the present invention to provide a method of dimensional real time animation to be integrated into existing environments.

It is further an object of the present invention to provide a method and apparatus for user programmed real time animation within a portable visual display for purpose of education and entertainment.

OBJECTS AND ADVANTAGES

Accordingly, several objects and advantages of the present invention are as follows:

(a) It is an object of the present invention to convey the illusory effect of animating static two or three dimensional objects in real time.
(b) It is another object of the present invention to maximize the viewing area from which a spectator may observe the aforementioned effect.
(c) It is yet another object of the present invention to eliminate the unnecessary visibility of required structural components of the device.
(d) It is a further object of the present invention to provide a continual, constant and appropriate speed of rotation in order to maintain effect for desired duration.
(e) It is still another object of the present invention to provide modular and posable objects for the purpose of altering and analyzing the effect of motion.
(f) It is yet another object of the present invention to allow the continual and unobstructed view of the objects during their cycle of rotation.
(g) It is still another object of the present invention to allow for related product addability.
(h) It is a further object of the present invention to allow adaptability to include devices of a musical nature.
(i) It is another object of the present invention to provide an illusory effect that may integrated within existing situations.

The above and other objects, features and advantages of the present invention will become readily apparent from the following detailed description which is to be read in connection with the accompanying drawings.

SUMMARY OF THE PRESENT INVENTION

In the present invention, the simulation motion is achieved with of a strobe light and its effect on sequentially posed-dimensional objects that travel on a rotational surface. The strobe light provides the required shutter effect and eliminates the need for the slitted cylindrical drum of earlier animation devices. Previous devices of this nature limit the spectator's view to the far inside wall of the rotating drum. The absence of this cylinder allows the spectator to observe the effect from anywhere outside and or, in some embodiments, inside the rotating surface, thus broadening the area from which a spectator may view the effect.

In the present invention, the objects to be animated may be two or three dimensional and are not restricted to containment within a cylindrical drum. This allows the spectator to maintain a continual and unobstructed view of the objects during their cycle of rotation. The absence of the cylinderical drum also allows the objects to animate within an x-y-z axis. The objects may also be removed, reposed and replaced in different sequences as per the user's whim.

LIST OF REFERENCE NUMERALS

Figure 1:
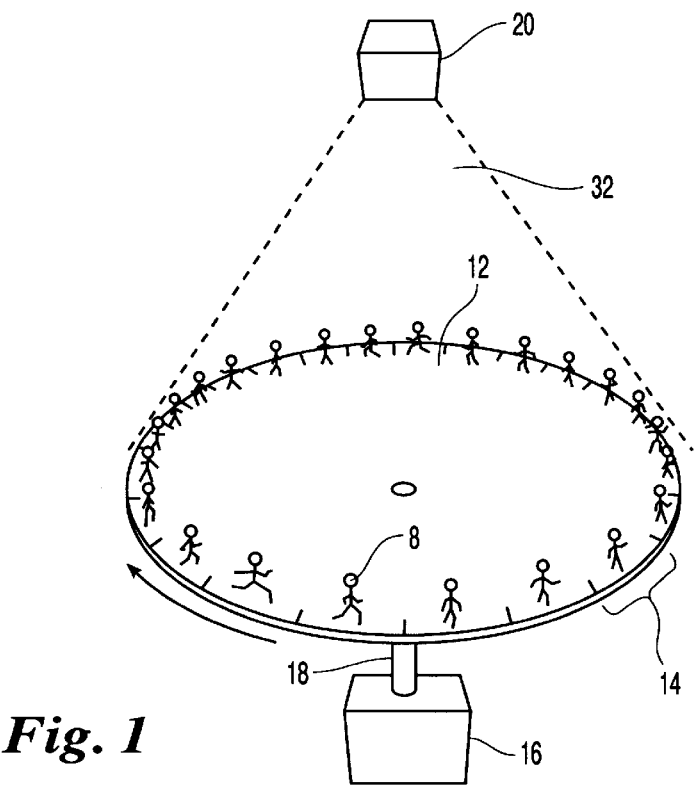
FIG. 1 is a perspective view of the apparatus of the present invention.

8 object
10 object support 12 rotational surface
12A ring
12B belt
12C sphere
14 staging area
16 motor
18 motor arbor
20 strobe light
22 ultra violet filter
24 focused beam lens
26 themed enclosure
28 view opening
30 rigid support
32 area of illumination
34 facade
36 roller
38 music box
40 wheel

DESCRIPTION OF INVENTION

A method and apparatus for animating a sequence of inanimate two or three dimensional objects in real time is described. In the following description, claims and drawings these dimensional objects shall be referred to as objects. Also in the following description numerous specific details are set forth, such as placement of strobe lights, type of lens, placement of motor, direction of rotation, style of enclosure, etc., in order to provide a more thorough understanding of the present invention. It will be obvious, however, to one skilled in the art, that the present invention may be practiced without these specific details. In other instances, well known features have not been described in detail in order not to unnecessarily obscure the present invention. In the following description, the present invention and various embodiments are described in which reference is made to the method of animating inanimate objects which are attached by a inconspicuous support to a rotational surface and are illuminated by a strobe light. Such description is, by way of example only, and is not a limitation on the scope of the present invention. It will be understood that any rotational surface, disk, ring, cylinder or belt or any combination thereof, may be utilized in combination with any number of strobe lights to illuminate any number of objects of any scale or form with the present invention.

FIG. 1 illustrates an embodiment of the present invention in which a plurality of objects 8 are individually detachably, with inconspicuous supports, to a rotational surface 12. The center of the rotational surface 12 is connected to the arbor 18 of variable speed motor 16. Each object 8 is situated within its own respective staging area 14. The staging areas 14 are stationary sectors of air space surrounding the circumference of rotational surface 12. The staging areas 14 are equal in size to one another and are situated side by side.

In the present invention the objects 8 are individually posed, each representing a progressive increment of motion by subtly altering, in succession, the pose of each object 8 from that of the previous object 8, in cyclical order.

A strobe light 20 is implemented to illuminate, with flashes of consistent periodicity, the objects 8 as they cycle with the rotational surface 12.

By adjusting the rate of the strobe light's 20 pulse to correspond with the rpm of the rotational surface 12, which is connected to and driven by a variable speed motor 16, the desired effect may be achieved. The strobe light 20 illuminates, with a flash of light, each object 8 as it moves into the vacant staging area 12 of the previous object 8 along its cyclical path, thus resulting in the illusion of sustained movement. This effect can be further enhanced when fluorescent color is added to the objects 8 and an ultra violet filter 22 is placed between the strobe light 20 and the objects 8. This reduces the unwanted illumination of structural components of the present invention. Musical devices, both electronic and mechanical may be employed to enhance the overall experience of the present invention. A prefabricated mechanical musical device such as a hand cranked music box 38, may be retrofitted with a wheel 40. The rotational surface 12 of the present invention may serve as an actuator for the music box 38 by placing the wheel 40 of the music box 38 perpendicular to and in contact with the rotational surface 12. In the detail drawing of FIG. 6A a music box 38 interfacing with the rotational surface 12 is shown.

Figure 2:
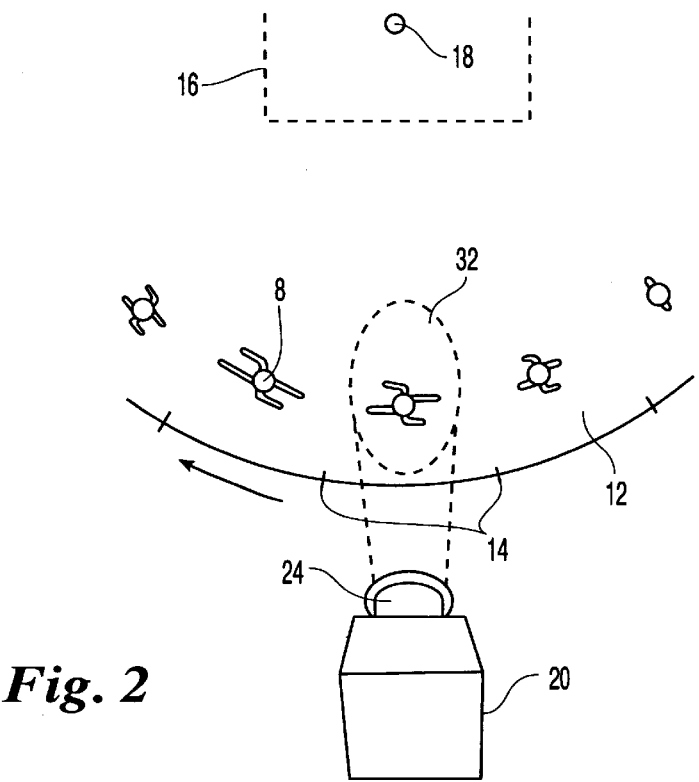
FIG. 2 is a detail plan view of another embodiment of the present invention where illumination is focused through a lens.
Figure 3:
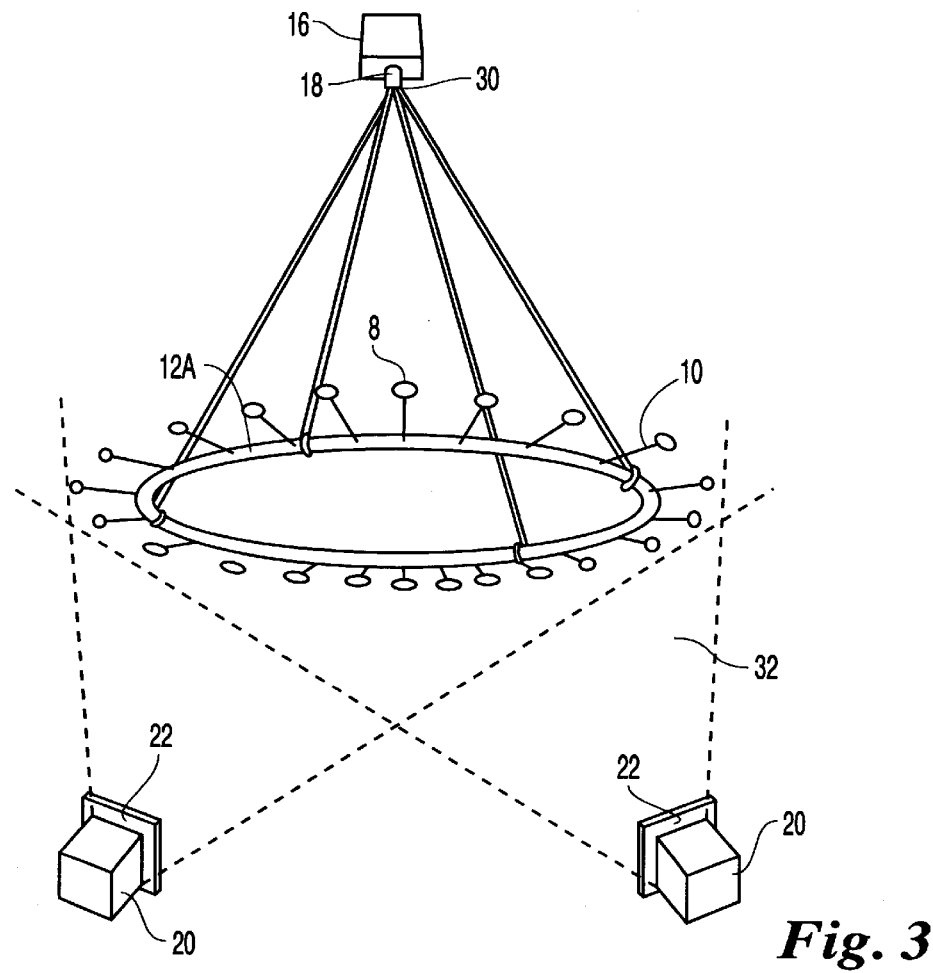
FIG. 3 is a spectator's point of view of an alternate embodiment of the present invention in which the rotational surface is a ring suspended by rigid support from a motor above.
Figure 4:
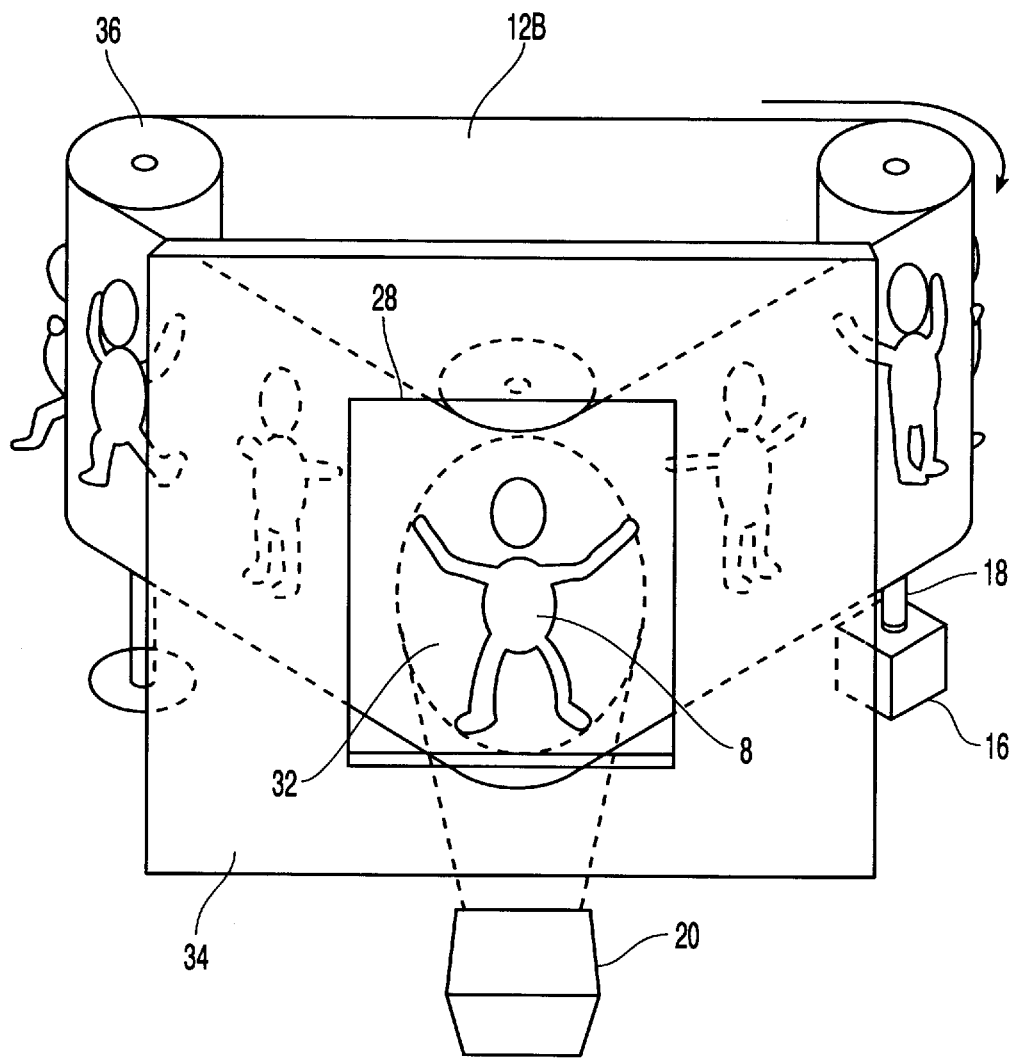
FIG. 4 is a perspective view of an alternate embodiment of the present invention in which the rotational surface is a flexible belt.

FIG. 2 is a detail plan view of an alternate embodiment of the present invention illustrating the addition of a focused beam lens 24 which is mounted to the strobe light 20. The utilization of the focused beam lens 24 confines the beam of the strobe light 20 to affect only the staging area 14 on which it is focused. This focused illumination allows only one object 8 to be illuminated at a time, resulting in the illusion that a single object 8 is animating in a single staging area 14 in FIG. 3 Illustrates an alternate embodiment of the present invention as seen from a spectator's point of view. In this embodiment of the present invention the rotational surface 12 is a ring 12A. the ring 12A is attached to and suspended from the arbor 18 of a variable speed motor 16 by means of a rigid support 30. Attached to the ring 12A is a series of objects 8. which are illuminated by a strobe light 20 that is fitted with an ultra violet filter 22. The ultra violet filter 22 eliminates the white light of the strobe light, preventing the illumination of the overhead motor 16, support system, or ceiling. By suspending the ring 12A spectators may observe the effect of animation from below or within the rotating ring 12A In FIG. 4 an alternate embodiment of the present invention is illustrated in a perspective view. In this embodiment the rotational surface 12 is a flexible belt 12B which is joined end to end and wraps around a plurality of rollers 36. The objects 8 are attached to the belt 12B. The flexibility of the belt 12B allows the objects 8 to travel an irregular but cyclical path. In the example shown, a flat belt 12B encircles a plurality of vertical rollers 36. One roller 36 is driven to rotate by a motor 16 connected at the roller's 36 axis. Another roller 36 protrudes through a view opening 28 in a facade 34 which is parallel to the rollers 36. The remaining rollers 36 are for purpose of allowing additional stability as well as additional length to the belt 12B. Applied to the outside surface of the belt 12B is a plurality of objects 8. Each time an object 8 on the belt 12B, traverses through the view opening 28 in the facade 34, the strobe light 20 flashes. The resulting effect is the appearance of a single object 8 animating within a single staging area 14 in real time.

Figure 5:
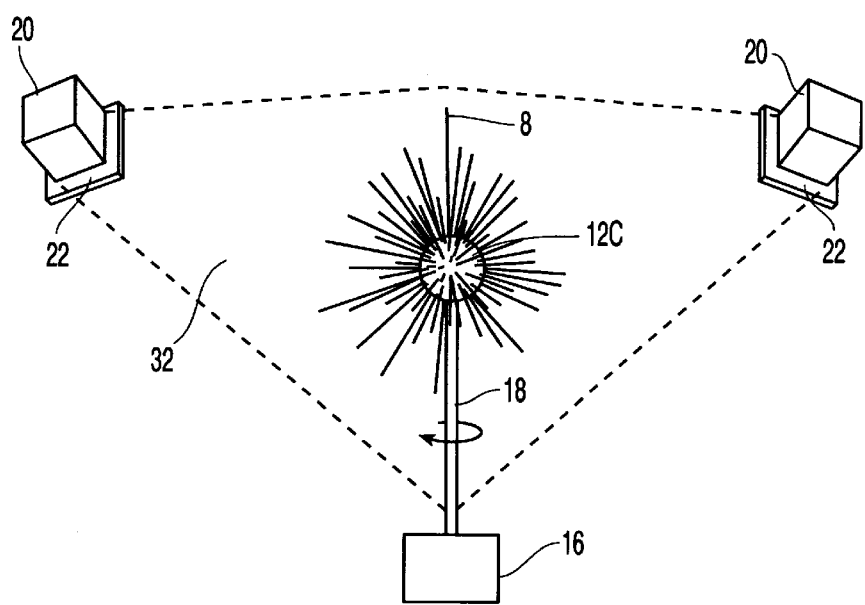
FIG. 5 is a side view of an alternate embodiment of the present invention showing a single object at the center of the rotational surface.

FIG. 5 Is a side view illustrating an alternate embodiment of the present invention in which the rotational surface 12 is a sphere 12C. which is attached to and driven by a motor 16. Attached to and radiating from the sphere 12C is a plurality of objects 8, in this instance the objects 8 are a plurality of rods varying in lengths and fluorescent colors.

Some of the rods are black in color. A strobe light 20 or plurality of strobe lights 20 is fitted with an ultra violet filter 22 in order that only the fluorescent rods may be illuminated. As the motor 16 spins the attached sphere 12C, the colored rods appear to flicker due to the parallax effect of the black rods passing in front of the colored rods.

Figure 6:
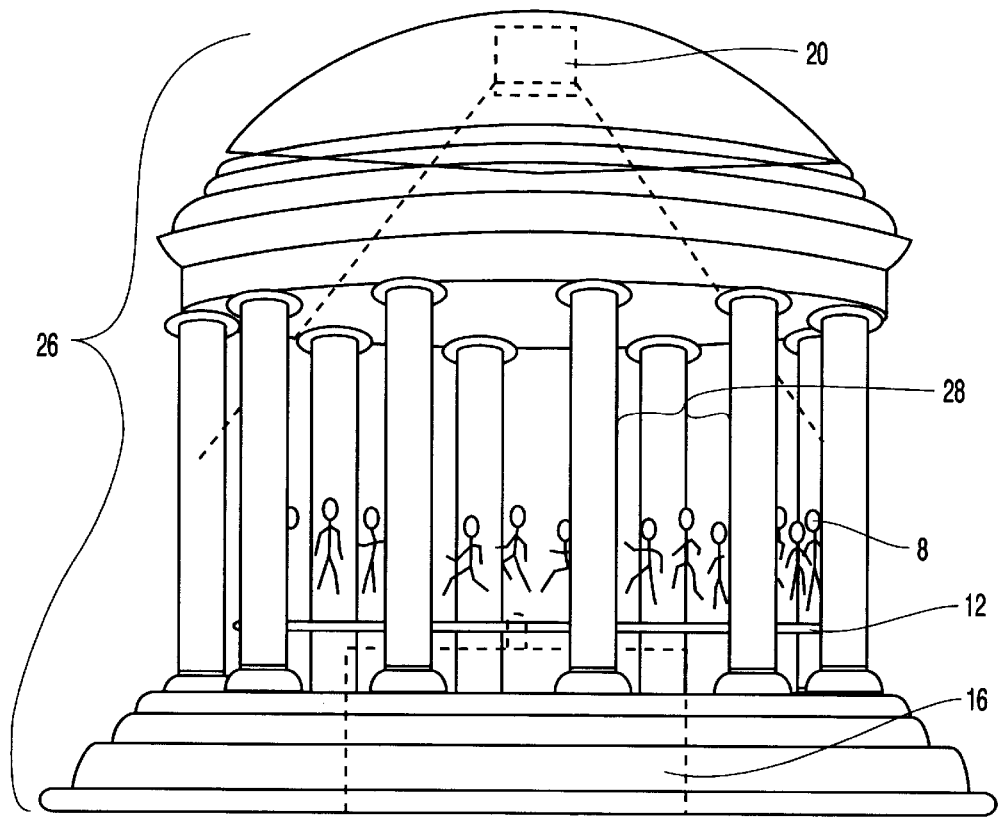
FIG. 6 is a spectators point of view showing the embodiment of FIG. 1 contained within a themed enclosure.

FIG. 6 is a perspective view illustrating the embodiment of FIG. 1 contained within a themed enclosure 26 to create the theme for the enclosure 26 can correspond to the subject matter of the animation contained within. for example if the animated sequence is that of tigers jumping through a hoop, the theme of the enclosure 26 may be a circus tent.

Figure 6A:
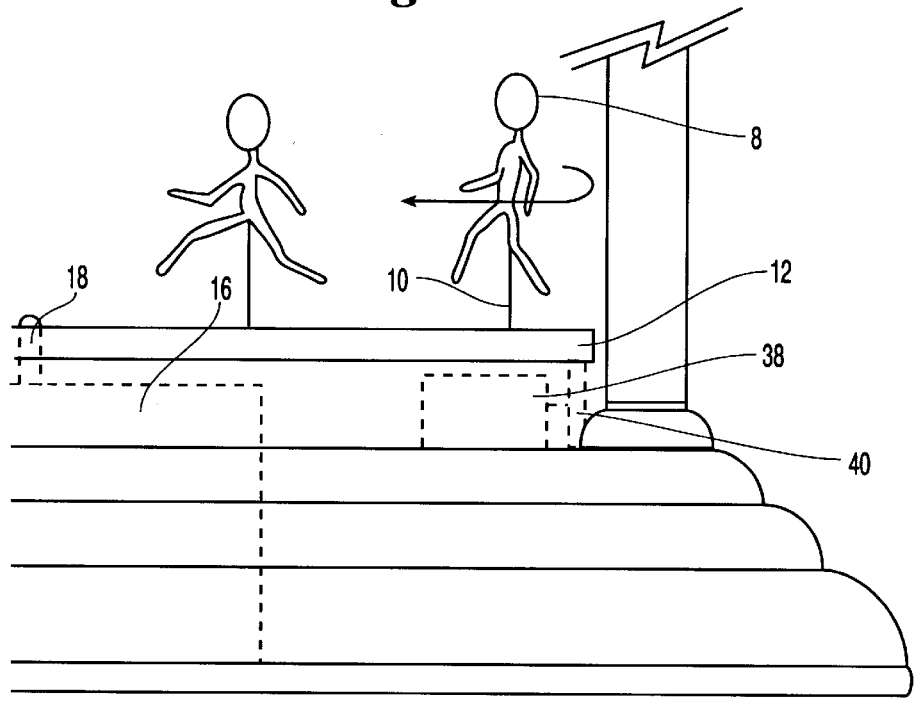
FIG. 6A is a detail of FIG. 6 showing the adaption of a preexisting music box.

FIG. 6A In this detail illustration of FIG. 6 the hand crank of conventional musicbox 38 has been replaced with a traction wheel 40, which is activated by the rotational surface 12. of the present invention. As it revolves a musical tune is produced.

Although the present invention has been discussed with respect to inanimate or static objects 8 both two dimensional and three dimensional it will be obvious that the objects 8 may be of a non static nature or a combination of non static material such as fabric or string that may flutter resulting from the movement of the rotational surface 12.

CONCLUSION, RAMIFICATIONS, AND SCOPE OF INVENTION

Thus, a unique method and apparatus for animating a sequence of objects has been described.

While the above description contains many specificities, these should not be construed as limitations on the scope of the invention, but rather as an exemplifications of a few of the preferred embodiments thereof. Many other variations are possible. Accordingly, the scope of the invention should be determined not by the embodiments illustrated, but by the appended claims and their legal equivalents.

I claim:

1. An apparatus for animating a sequence of inanimate objects comprising a movable support member mounted for movement along a predetermined cyclical path, drive means for moving said support member, a plurality of posable objects capable of adjustment to incrementally differing shapes detachably mounted on said support in a cyclical order each representing an increment of motion upon movement of said objects along said path, strobe light means for illuminating said objects and light filter means for filtering undesirable light mounted intermediate said strobe light means and said objects.

2. An apparatus as set forth in claim 1, wherein said light filter means is an ultraviolet light filter, wherein said objects are provided with fluorescent colors so that upon illumination of said objects apparent luminosity of said objects will be enhanced and undesirable illumination of structural components other than said objects will be diminished.

3. An apparatus as set forth in claim 1, wherein said movable support member is a sphere on which said objects are detachably mounted.

4. An apparatus as set forth in claim 1, wherein said movable support member is a disk on which said objects are detachably mounted.

5. An apparatus as set forth in claim 1, wherein said movable support member is a ring on which said objects are detachably mounted.

6. An apparatus as set forth in claim 1, wherein said movable support member is a continuous flexible belt mounted for movement along a cyclical but irregular path.

7. An apparatus as set forth in claim 1, wherein said strobe light means is comprised of a plurality of strobe lights synchronized with one another to enhance illumination of said objects.

8. As apparatus as set forth in claim 1, wherein said strobe light means is comprised of a plurality of non-synchronized strobe lights, each fitted with a different colored filter to provide a ghosting effect of said objects.

9. An apparatus as set forth in claim 1 further comprising a focused beam lens operatively connected to said strobe light means for illuminating one of said objects per pulse of said strobe light as said objects travel along said cyclical path to create an illusory effect of a single moving object moving in real time within a single staging area.

10. A method for animating a sequence of inanimate objects comprising the steps of detachably mounting a plurality of posable objects of differing shapes on a movable support member in a cyclical order each representing an increment of motion upon movement of said objects along said path, illuminating said objects by means of a strobe light to provide illusory animation as each object successively replaces a prior object in synchronization with each pulse of said strobe light and coloring said objects with fluorescent colors and passing light from said strobe light means through an ultraviolet filter mounted intermediate said strobe light means and said objects so that upon illumination of said objects apparent illuminosity of said objects will be enhanced and undesirable illumination of structural components other than said objects will be diminished.

11. A method for animating a sequence of inanimate objects as set forth in claim 8 further comprising focusing light from said strobe light means on a single staging area through which said objects pass whereby upon illumination of one of said objects per pulse of said strobe light means creates an illusory effect of a single object moving in real time within said staging area.

\* \* \* \* \*